United States Patent
Bezerra et al.

(10) Patent No.: US 9,902,461 B2
(45) Date of Patent: Feb. 27, 2018

(54) RIDER-POWERED VEHICLES AND MECHANISMS THEREOF

(71) Applicant: ARC287BC Corporation, Totowa, NJ (US)

(72) Inventors: Wilson X. Bezerra, Belleville, NJ (US); Silvana A. Bezerra, Belleville, NJ (US); Gabor Nagy, Clifton, NJ (US)

( * ) Notice: Subject to any disclaimer, the term of this patent is extended or adjusted under 35 U.S.C. 154(b) by 83 days.

(21) Appl. No.: 14/832,430

(22) Filed: Aug. 21, 2015

(65) Prior Publication Data

US 2017/0050699 A1  Feb. 23, 2017

(51) Int. Cl.
| | | |
|---|---|---|
| B62M 1/30 | (2013.01) | |
| B63H 16/18 | (2006.01) | |
| B62M 1/14 | (2006.01) | |
| B61D 15/10 | (2006.01) | |
| B64D 31/04 | (2006.01) | |
| B63H 16/20 | (2006.01) | |

(52) U.S. Cl.
CPC .............. B62M 1/30 (2013.01); B61D 15/10 (2013.01); B62M 1/14 (2013.01); B63H 16/18 (2013.01); B63H 16/20 (2013.01); B64D 31/04 (2013.01)

(58) Field of Classification Search
CPC ...................................................... B62M 1/30
USPC ....................................................... 280/253
See application file for complete search history.

(56) References Cited

U.S. PATENT DOCUMENTS

| | | |
|---|---|---|
| 636,184 A | 10/1899 | Roxendorff |
| 3,039,790 A | 6/1962 | Trott |
| 3,954,282 A * | 5/1976 | Hege ................... B62M 1/28 280/251 |
| 3,984,129 A | 10/1976 | Hege |
| 4,227,712 A | 10/1980 | Dick |
| 4,456,276 A | 6/1984 | Bortolin |
| 4,666,173 A | 5/1987 | Graham |
| 4,829,841 A | 5/1989 | Ogawa |
| 5,335,927 A | 8/1994 | Islas |
| 5,964,332 A | 10/1999 | King |
| 6,554,309 B2 | 4/2003 | Thir |
| 8,632,089 B1 | 1/2014 | Bezerra |
| 8,979,107 B2 | 3/2015 | Lin |
| 2006/0055144 A1 | 3/2006 | Norman |
| 2008/0085798 A1* | 4/2008 | Miller .................. B62J 1/28 474/78 |

(Continued)

OTHER PUBLICATIONS

International Search Report and Opinion for PCT/US16/47698, dated Nov. 4, 2016.

*Primary Examiner* — Kevin Hurley
*Assistant Examiner* — Felicia L. Brittman

(57) ABSTRACT

A motion transfer apparatus comprising a frame; at least one wheel shaft operably coupled to at least one wheel, the at least one wheel shaft rotatable on the frame; a gear assembly coupled to the at least one wheel shaft; at least one pedal engaging the gear assembly and movable by an appendage within a predetermined angular range to apply a force; at least one crank arm with a predetermined length coupled to the at least one pedal and to the gear assembly for applying the force directly from the pedal to the gear assembly to rotate the at least one wheel; and a restorative member generating a restorative force to return the pedal and the at least one crank arm from a lower stroke position to an upper stroke position.

25 Claims, 13 Drawing Sheets

(56) References Cited

U.S. PATENT DOCUMENTS

2010/0320720 A1  12/2010  Bezerra

* cited by examiner

RIDER-POWERED VEHICLES AND MECHANISMS THEREOF

BACKGROUND OF THE INVENTION

1. Field of the Invention

The present invention relates to vehicles, and in particular to a rider-powered vehicle and mechanism thereof.

2. Description of Prior Art

There are few human activities more universal than riding a bicycle. Bicycles are used around the world for transportation, exercise and as a fun and exhilarating activity. Indeed, riding a bicycle is something that millions of people around the world engage in every single day, and the vast majority of those people take it completely for granted.

The biking world currently spends millions of dollars each year trying to make a regular bicycle go faster with new designs. In the last few hundred years, the basic bicycle design has not changed either. With two pedals and corresponding crank arms, a chain and various other parts, the rider applies the pedals in a circular motion and propels the bicycle forward. It is simple, easy and almost universal.

Unfortunately, this design is also inherently wasteful and dangerous. Hundreds of thousands of riders around the globe have been injured and even killed when their bicycle failed due to the enormous amount of stress put on the bicycle's frame, especially the front forks.

The reason is simple. The traditional bicycle design forces the rider to use a jerking motion from side-to-side when riding, and also puts intense downward forces on the center of the frame. This force is also unevenly distributed, transferring tremendous forces to the front forks as well which, unfortunately, have a tendency to fail, causing horrific accidents.

One only has to perform a quick online search to find references to a multitude of lawsuits brought against bicycle manufacturers, usually by riders who were injured while riding a bicycle whose frame failed. Examples abound, including an employee of the outdoor products company who was paralyzed after the bicycle he was riding broke apart because its frame was unable to withstand the normal forces exerted from riding. Others include one of the most respected bicycle companies in the industry, which was recently forced to recall over 1 million of their bicycles, and another bicycle company which recalled hundreds of their bikes after realizing that the frame could break apart under normal riding conditions.

Also, conventional bicycles in the prior art typically involve a rider applying forces from their legs to pedals which revolve 360 degrees around an axis, which transfers the rotational motion to rotate a wheel axle using a gear and chain assembly. Thus, the rider is forced to use six or more leg muscles if he wants to propel the conventional bicycle forward. He or she must use the hip extensor, knee extensors, ankle planter flexors, ankle dorsiflexors, hip flexors and the knee flexors. Excessive use of these muscles overtime may cause damages to the knees and other parts of the body.

FIG. 1 is a diagram 10 representing muscles of human legs active during rotational action on a pedal in the prior art, in which the various extensors and flexors in the leg are utilized during certain angular ranges of the revolving pedal. FIG. 2 is a representation of a side view of muscles in a human leg in the prior art, and FIG. 3 is a representation of a front view of muscles in the thigh of a human leg in the prior art.

As shown in FIGS. 1-3, hip extensor muscles 12 primarily apply force to the pedal clockwise in a range 32 from the 12 o'clock position to the 3 o'clock position, while knee extensor muscles 14 primarily apply force to the pedal clockwise in a range 34 from the 3 o'clock position to the 5 o'clock position, ankle plantar flexor muscles 16 primarily apply force to the pedal clockwise in a range 36 from the 5 o'clock position to the 6 o'clock position, the ankle dorsiflexor muscles 18 primarily apply force to the pedal clockwise in a range 38 from the 6 o'clock position to the 8 o'clock position, the knee flexor muscles 20 primarily apply force to the pedal clockwise in a range 40 from the 8 o'clock position to the 9 o'clock position, and the hip flexor muscles 22 primarily apply force to the pedal clockwise in a range 42 from the 9 o'clock position to the 12 o'clock position.

However, most of the power applied to the pedal is only most efficiently applied in a limited range of angular orientations, i.e., between approximately 2 and 4 o'clock, with much of the motion of the pedal and the legs of the rider being wasted or inefficiently utilized.

The fact is that the traditional bicycle design is inherently wasteful as far a rider energy is concerned. Much of the force a rider applies is lost as it is transferred to other parts of the bicycle rather than the wheels. In fact, for years bicycle designers have been doing their absolute best to get more power, and higher RPMs, out of the traditional bike design, but to no avail. Most designs are currently stuck at about 100 RPMs, with the absolute limit at 120. Thus, their charts display only up to 120 RPMs.

In addition, such conventional bicycles in the prior art are typically constructed for riders using two legs, which is not readily adaptable to people with only one leg, no legs, prosthesis, etc. One of the biggest problems with traditional bicycle design—the inability to ride if you're disabled. A paraplegic, a soldier missing one or both legs or someone suffering from a debilitating muscular disease that affects their arms and legs simply cannot ride a bicycle, much as they might want to do so and enjoy this fantastic, fun and energizing activity.

The conventional bicycle has one chain, a front sprocket (chain-ring) and a rear cog (multi-sprocket). This system has several limitations. If the rider desires to have different speeds on the bicycle he must be able to change gears with a derailleur. The bicycle chain must be thin enough to switch gears in the rear of the cog. This puts further limitations on the size of the chain and the size of the rear cog. In order to go faster a rider must switch to the smallest sprocket in the rear of the bicycle. This restricts the size of the chain and the sprocket and how the chain is aligned to the rear cog. Thus, in the conventional bicycle, the smaller the sprocket, the less chain is available to grab the sprocket in order to propel the bicycle forward. This also causes the chain to be misaligned with the rear cog. Since the rear sprocket is small this limits the number of teeth in order to grab the chain. A jumping of the chain may occur and the chain may wear and tear at the sprocket. Either the chain will snap or sprocket teeth will bend or break after a heavy load.

OBJECTS AND SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention discloses a rider-powered vehicle and mechanisms thereof which produces more than 500% more torque than the bicycle of the prior art. In fact, while a conventional bike cannot exceed 120 RPMs, the present bicycle can exceed 175 RPMs, something unheard of in the industry and an absolute quantum leap forward in terms of power production.

The bicycle of the present invention is superior to a conventional bicycle in many ways, much of which has to do with how forces are applied when riding. With the present bicycle, the up and down stepping motion turns much more of the rider's energy into forward motion. The present bicycle applies force where it should be applied, in the rear wheel of the tire. When force is applied to the pedal it is transmitted directly to the rear axle and onto the roller bearings which bypass the frame and the forces are applied directly to the rear wheel. Very little or no stress is placed on the frame or the fork. The forces in the present bicycle cause a pushing action instead of a pulling action of a conventional bicycle. At the same time, the rider puts significantly less downward force on the frame, and the frame is capable of absorbing more of the shock from uneven road surfaces.

Even better, the present bicycle does this while using fewer muscles than a conventional bicycle, two instead of six. The present bicycle uses the strongest and most efficient muscles of the body which are the hip extensor and the knee extensors. These are the muscles that we use for walking and running. It is rarely reported, if ever, that these two muscles suffer from fatigue over an extended period of time.

The present bicycle is also inherently safer because of the significantly reduced forces on the frame when riding, something that will undoubtedly lead to a significant reduction in accidents, injuries and their consequent lawsuits.

The bicycle of the present disclosure is not only easier to ride with two normally functioning legs but can also be ridden by someone with one leg or even no legs. Therefore, the bicycle of the present invention could be enjoyed by people of all walks of life.

The bicycle of the present invention has a pedal, crank arm, one way clutch and a mechanical return. These parts work in combination with each other. They are known as a PCCM assembly. The M can be a sprocket, spring or any other device that allows the crank arm to return to the upper position. The M when combined with a spring or MS for short allows the rider the advantage of only applying force in the downward or clockwise motion at all times. The system will automatically, with the aid of the spring, raise the crank arm to the upper position. If the rider wanted to pedal faster, he can use a clipless pedal. The pedal in the PCCM is located on the top of the crank arm instead of on the side of the crank arm. Placing the pedals on top of the crank arm offers a few advantages: (i) it eliminates the swaying and jerking that occurs on the conventional bicycle; (ii) since the crank arms are curved this allows the pedals to be placed directly on top of the crank arm and thus, no force is lost or transmitted to the frame; (iii) the ability of the rider to stand up at all times while applying force with the two strongest muscles in the body—hip extension and the knee extensions; (iv) the PCCM allows the rider to apply force in a downward stroke at all times; (v) since the pedals and crank arms are not attached to one another like the conventional bicycle and the forces are not applied to the center of the frame, the frame is not affected when the rider applies force; and (vi) the PCCM also allows the rider the ability to apply forces closer to the 90 degree or 3 o'clock zone—this is the zone that produces the most force to propel the rider forward—and the PCCM allows the rider to slow down the strokes while pedaling but yet increase his RPM or speed while riding.

This PCCM engages with the rotating bearing shaft assembly (RBSA), balanced multi-sprocket and dual chain (BMSDC), multi ratio transmission (MRT), and with the cog, hub and wheel assembly (CHW), such that when used in combination with each other removes or eliminates any restrictions imposed by the current conventional bicycle. The PCCM, RBSA, BMSDC, MRT and CHW, when used in combination with each other will allow the rider to increase or decrease their RPM, MPH, torque, distance and speed of the bicycle much more efficiently than the conventional bicycle. Even though force is applied to the pedals, the CHW is the last to engage.

The BMSDC allows the chain to be aligned at all times with the rear cog. Since the multi combination sprockets can be adjusted up or down, this allows the chain to be in line with the rear sprocket. The ratios of the sprocket can be adjusted so the chain wraps around most of the teeth of the sprocket. The reduces chain and sprocket failure due to overloading the sprocket and chain with forces.

The RBSA has a sprocket attached directly to the rear shaft. When force is applied to the pedal (PCCM assembly) it sends the forces away from the frame and redirects it to the BMSDC system. The BMSDC system keeps the forces on the opposite side of the bicycle away from the driving chain and cog. The forces are then transmitted evenly and balanced (changed, altered, and controlled) throughout the other sprockets and to the CHW. The forces are never directed toward the frame of the bicycle; thus reduces or eliminates frame or fork failure.

To achieve the above objects and further advantages described below, rider-powered vehicles and mechanisms thereof are disclosed. In one embodiment, the mechanism is a motion transfer apparatus comprising: a gear assembly coupled to the rider-powered vehicle having at least one wheel operably coupled to a wheel shaft rotatable on a frame; at least one pedal engaging the gear assembly and movable by an appendage within a predetermined angular range to apply a force; and at least one crank arm with a predetermined length coupled to the at least one pedal and to the gear assembly for applying the force directly from the pedal to the gear assembly to rotate the at least one wheel. The appendage is selected from the group consisting of a prosthetic member, a single hand, a single foot, a single forearm, a single foreleg, and a pair of hands. The rider-powered vehicle is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft.

The predetermined angular range of movement of the pedal is less than 360 degrees, such as about 45 degrees, or between about 67.5 degrees clockwise from a vertical direction to about 112.5 degrees clockwise from the vertical direction. The gear assembly includes a one-way clutch coupling the at least one crank arm to the at least one wheel for applying the force in a one-way rotational direction to the at least one wheel. A restorative member is included for generating a restorative force to return the pedal and the at least one crank arm from a lower stroke position to an upper stroke position. The restorative member is, for example, a spring.

Alternatively, the at least one crank arm includes first and second crank arms; and the restorative member is a pulley attached to the first and second crank arms for moving the first crank arm to the upper stroke position when the second crank arm is moved to the lower stroke position, and for moving the first crank arm to the lower stroke position when the second crank arm is moved to the upper stroke position.

An engagement member allows the wheel shaft to freely rotate relative to the frame. The engagement member is at least one roller bearing and/or is composed of a lubricant. The gear assembly includes a plurality of stepper gears for increasing the speed transfer of the force from the at least one crank arm to the at least one wheel. The at least one wheel is selected from the group consisting of: a front wheel attached to the wheel shaft rotatable on a front member of the frame; and a rear wheel attached to the wheel shaft rotatable on a rear member of the frame.

In another embodiment, the rider-powered vehicle includes: a frame; a wheel shaft rotatable on the frame; at least one wheel attached to and rotating about the wheel shaft; a gear assembly coupled to the at least one wheel; at least one pedal engaging the gear assembly and movable by an appendage within a predetermined angular range to apply a force; and at least one crank arm with a predetermined length coupled to the at least one pedal and to the gear assembly for applying the force directly from the pedal to the gear assembly to rotate the at least one wheel.

The appendage is selected from the group consisting of a prosthetic member, a single hand, a single foot, a single forearm, a single foreleg, and a pair of hands. The rider-powered vehicle is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft.

The predetermined angular range of movement of the pedal is less than 360 degrees. For example, the predetermined angular range of movement of the pedal is about 45 degrees. Alternatively, the predetermined angular range of movement of the pedal is between about 67.5 degrees clockwise from a vertical direction to about 112.5 degrees clockwise from the vertical direction.

The gear assembly includes a one-way clutch coupling the at least one crank arm to the at least one wheel for applying the force in a one-way rotational direction to the at least one wheel. A restorative member is included generating a restorative force to return the pedal and the at least one crank arm from a lower stroke position to an upper stroke position. For example, the restorative member is a spring. Alternatively, the at least one crank arm includes first and second crank arms; and wherein the restorative member is a pulley attached to the first and second crank arms for moving the first crank arm to the upper stroke position when the second crank arm is moved to the lower stroke position, and for moving the first crank arm to the lower stroke position when the second crank arm is moved to the upper stroke position.

An engagement member allows the wheel shaft to freely rotate relative to the frame. The engagement member is at least one roller bearing and/or is composed of a lubricant. The gear assembly includes a plurality of stepper gears for increasing the speed transfer of the force from the at least one crank arm to the at least one wheel. The at least one wheel is selected from the group consisting of: a front wheel attached to the wheel shaft rotatable on a front member of the frame; and a rear wheel attached to the wheel shaft rotatable on a rear member of the frame.

In a further embodiment, a cycle includes a frame; front and rear wheel shafts each rotatable on the frame; at least one front wheel attached to and rotating with the front wheel shaft rotatable on the frame; at least one rear wheel attached to and rotating about the rear wheel shaft rotatable on the frame; a gear assembly coupled to a gear-rotated wheel selected from the group consisting of the at least one front wheel and the at least one rear wheel, wherein the gear assembly includes a one-way clutch engaging the gear-rotated wheel for applying a force in a one-way rotational direction to the gear-rotated wheel; at least one pedal engaging the gear assembly and movable by an appendage within a predetermined angular range to apply the force, wherein the appendage is selected from the group consisting of a prosthetic member, a single hand, a single foot, a single forearm, a single foreleg, and a pair of hands, a pair of feet, and a pair of legs, wherein the predetermined angular range of movement of the at least one pedal is less than 360 degrees; at least one crank arm with a predetermined length coupled to the at least one pedal and to the gear assembly for applying the force directly from the pedal to the gear assembly to rotate the at least one gear-rotated wheel by the one-way clutch in the one-way rotational direction; and a restorative member generating a restorative force to return the pedal and the at least one crank arm from a lower stroke position to an upper stroke position.

The cycle is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft. The predetermined angular range of movement of the pedal is about 45 degrees. Alternatively, the predetermined angular range of movement of the pedal is between about 67.5 degrees clockwise from a vertical direction to about 112.5 degrees clockwise from the vertical direction.

The restorative member is a spring. Alternatively, the at least one crank arm includes first and second crank arms, and the restorative member is a pulley attached to the first and second crank arms for moving the first crank arm to the upper stroke position when the second crank arm is moved to the lower stroke position, and for moving the first crank arm to the lower stroke position when the second crank arm is moved to the upper stroke position.

An engagement member allows the corresponding wheel shaft of the gear-rotated wheel to freely rotate relative to the frame. The engagement member is at least one roller bearing and/or is composed of a lubricant. The gear assembly includes a plurality of stepper gears for increasing the power transfer of the force from the at least one crank arm to the at least one gear-rotated wheel.

BRIEF DESCRIPTION OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
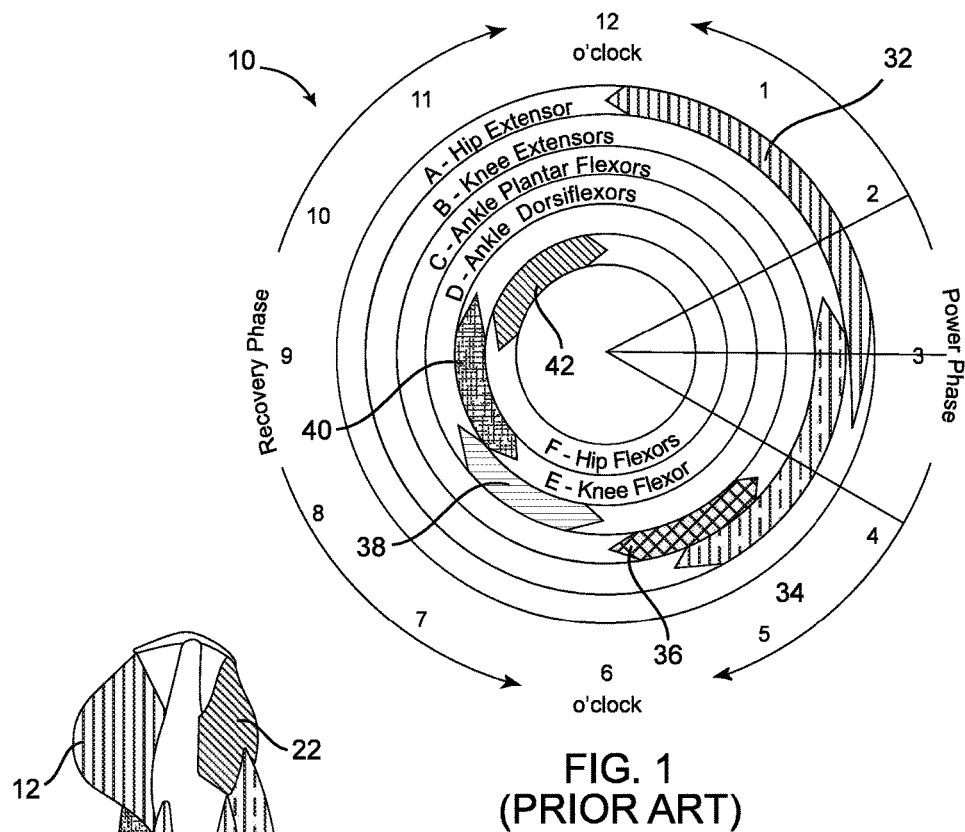
FIG. 1 is a diagram representing muscles of human legs active during the rotational action of a pedal of a bicycle in the prior art.
Figure 2:
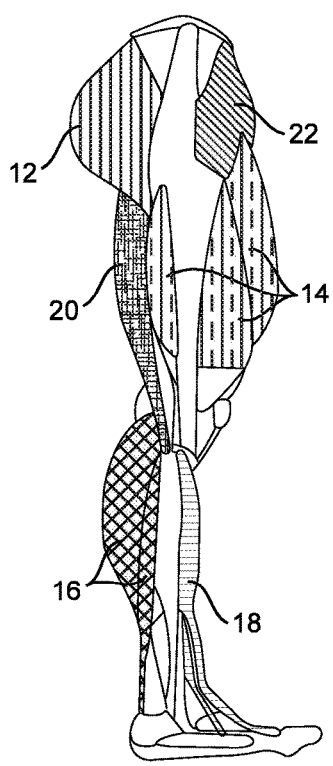
FIG. 2 is a representation of a side view of muscles in a human leg in the prior art.
Figure 3:
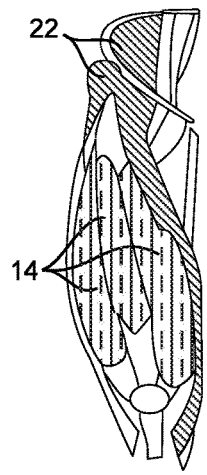
FIG. 3 is a representation of a front view of muscles in the thigh of a human leg in the prior art.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE PREFERRED EMBODIMENTS

Certain terminology is used in the following description for convenience only and is not limiting. The article "a" is intended to include one or more items, and where only one item is intended the term "one" or similar language is used. Additionally, to assist in the description of the present invention, words such as top, bottom, upper, lower, front, rear, inner, outer, right and left are used to describe the accompanying figures. The terminology includes the words above specifically mentioned, derivatives thereof, and words of similar import.

Figure 4:
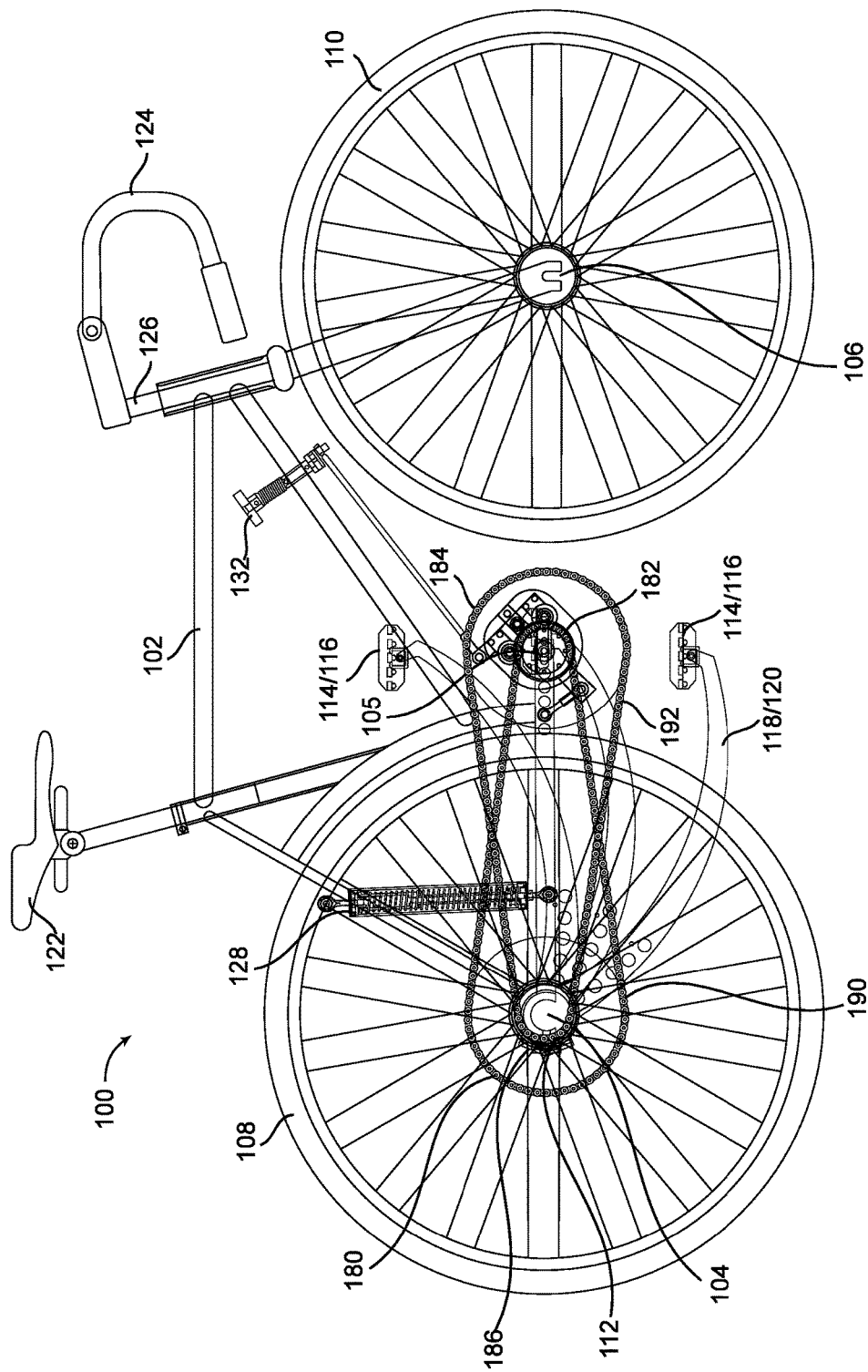
FIG. 4 is a side plan view of a rider-powered vehicle in a first embodiment of the present invention showing a pedal, crank arm, one-way clutch and mechanical return (PCCM) with a crank arm and pedal in three different states.

FIG. 4 is a side plan view of a rider-powered vehicle 100 in a first embodiment of the present invention. The rider-powered vehicle 100 includes at least a frame 102, at least one wheel shaft 104, 106 rotatable on the frame 102, at least one wheel 108, 110 attached to and rotating with a corresponding wheel shaft 104, 106, a gear assembly 112 coupled to the at least one wheel 108 such as the rear wheel 108, at least one pedal 114, 116 engaging the gear assembly 112 and movable by an appendage of the rider within a predetermined angular range to apply a force, and at least one crank arm 118, 120 with a predetermined length coupled to a corresponding at least one pedal 114, 116 and to the gear assembly 112 for applying the force directly from the at least one pedal 114, 116 to the gear assembly 112 to rotate the at least one wheel 108, 110. The gear assembly 112 includes the components that are utilized to transfer the forces to power the bicycle, namely, sprockets 180, 182, 184, 186; chains 190, 192; MRT 170; and one-way clutch 130.

Figure 5:
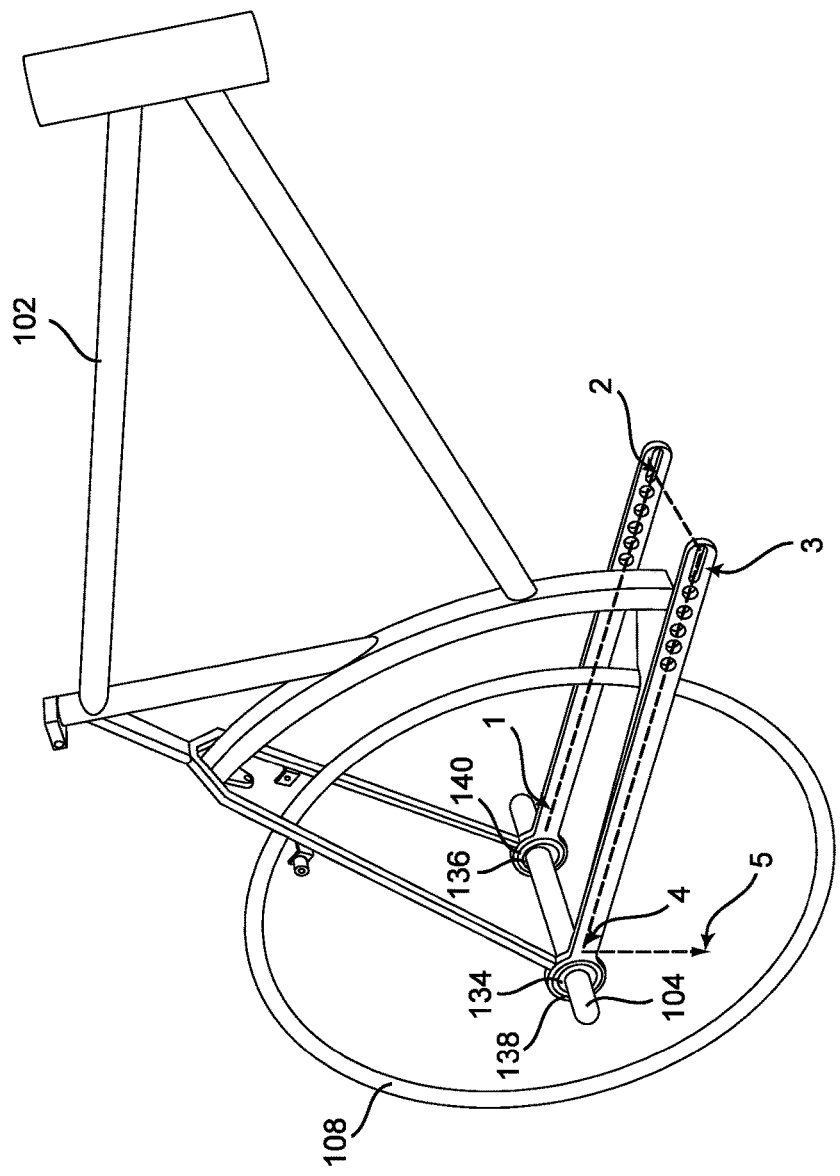
FIG. 5 is a top side perspective view of a frame of the vehicle in FIG. 4 illustrating a rotating bearing shaft assembly (RBSA)
Figure 12:
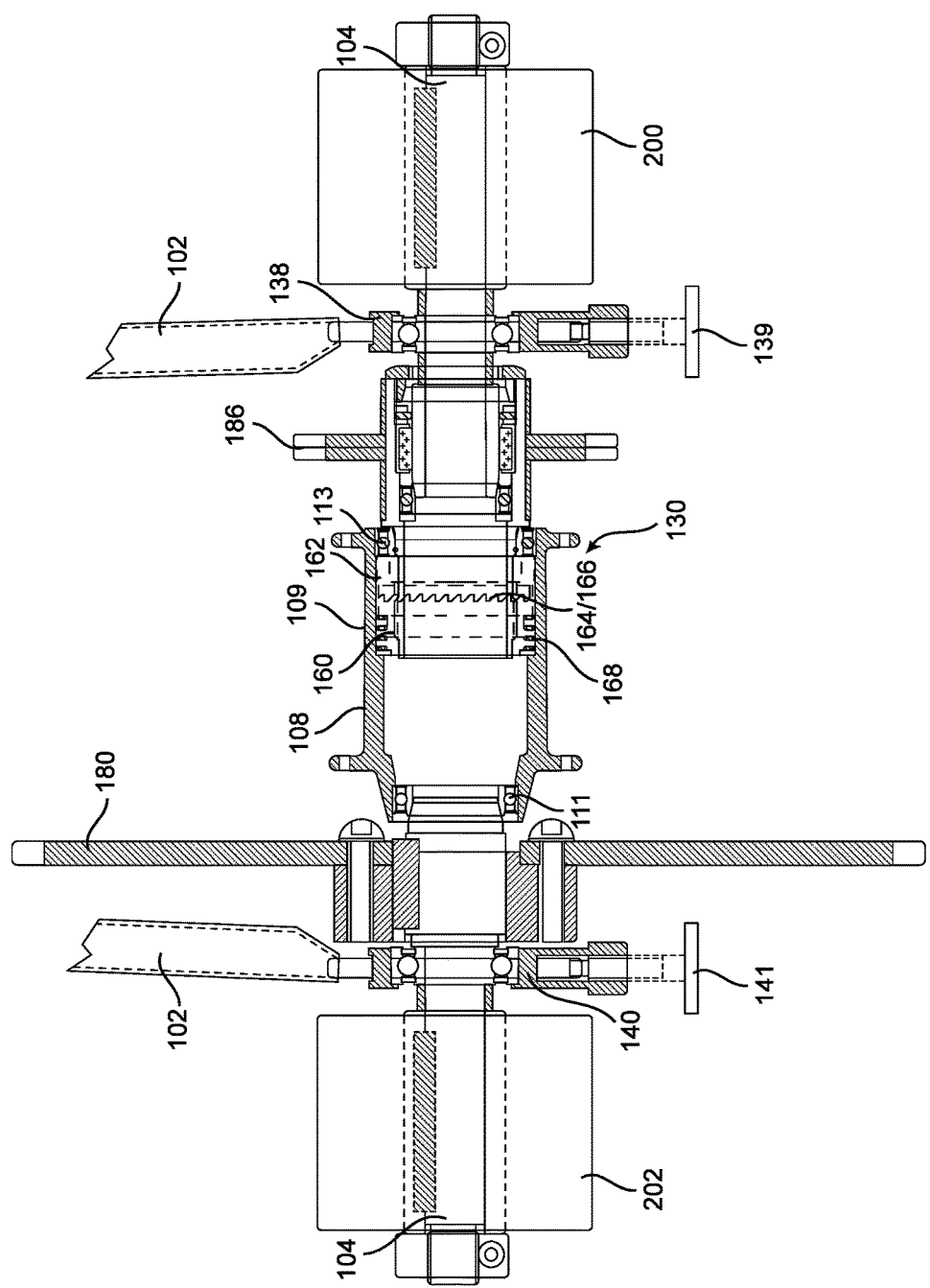
FIG. 12 is a cross-sectional view of a rear wheel shaft and rear portion of the gear assembly of the present invention.
Figure 13:
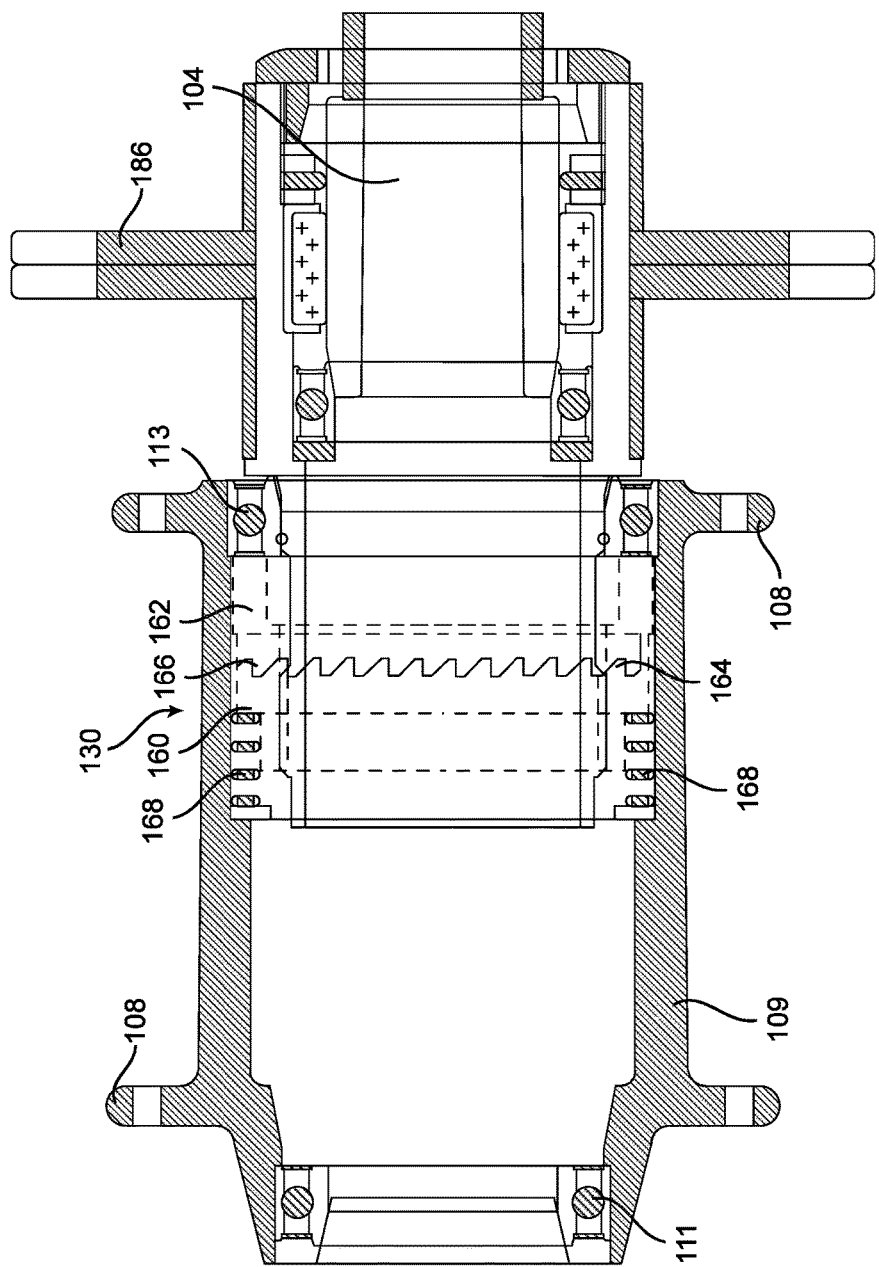
FIG. 13 is a cross-sectional view of the cog, hub and rear wheel assembly (CHW) and one-way clutch mechanism of the present invention.

In the example embodiment shown in FIGS. 4 and 5, the rear wheel shaft 104 is rotatably mounted to the frame 102 through the rear apertures 134, 136. The rear wheel shaft 104 is coupled to the frame 102 via engagement members 138, 140 (described in more detail below) such that the rear wheel shaft 104 is freely rotatable. The rear wheel 108 includes a hub 109 (collectively, wheel assembly), which circumscribes the rear wheel shaft 104, and is coupled to the adjacent assemblies by a pair of roller bearings 111, 113, as shown in FIGS. 12 and 13 and described in more detail below. Thus, the rear wheel shaft 104 as well as the rear wheel 108 rotate simultaneously completely independent of each other (at different speeds), as opposed to rear wheels of bicycles in the prior art which have shafts or axles fixedly secured to a frame of the bicycle, i.e., the prior art wheels rotate on the fixed axles. Alternatively, the shaft 104 and wheel 108 in FIG. 4 may be constructed as in the prior art with the shaft 104 fixed to the frame 102, and the wheel 108 rotating on the fixed shaft 104.

In the example embodiment shown in FIG. 4, the gear assembly 112 is operatively coupled to the rear wheel 108 via a rear right sprocket (or fourth sprocket) 186 (FIGS. 12 and 13). Specifically, rotational force is transferred from a left rear sprocket (or first sprocket) 180 to rotate a left front sprocket (or second sprocket) 182, a right front sprocket (or third sprocket) 184, a right rear sprocket (or fourth sprocket) 186 and a one-way clutch 130 to rotate the rear wheel assembly 108, 109, as shown in FIGS. 12 and 13. In alternative embodiments, the gear assembly 112 may be operatively coupled to only the front wheel 110 to rotate the front wheel 110 instead of the rear wheel 108. In a further alternative embodiment, one or more gear assemblies 112 may be operatively coupled to a respective one or both wheels 108, 110.

In the example embodiment shown in FIG. 4, two pedals 114, 116 and their respective crank arms 118, 120 are on opposite lateral sides of the frame 102 to be pedaled by two respective appendages of the rider. Alternatively, only one pedal and only one crank arm, such as the pedal 114 and crank arm 118, are on a common lateral side of the frame 102 to provide a single pedal-crank arm configuration of the rider-powered vehicle 100 to pedal the vehicle 100 with a single appendage.

The appendage of the rider for applying the motive forces is selected from the group consisting of a prosthetic member, a single hand, a single foot, a single forearm, a single foreleg, and a pair of hands, allowing a rider with two, one, or zero legs to use their available legs, prostheses, or arms to power the vehicle 100.

The rider-powered vehicle 100 is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft. Other types of rider-powered vehicles are contemplated, such as monowheels, celeripedes, carts, mopeds, and hybrid human-powered and motor-powered vehicles.

In the illustrative example embodiment of the present invention shown in FIGS. 4-9, the rider-powered vehicle 100 is a velocipede, or other types of cycles or vehicles constructed according to the structures and principles of the present invention described herein.

As shown in the example embodiment in FIG. 4, the vehicle 100 includes the frame 102 on which are mounted the front wheel 110 and the rear wheel 108, as well as a seat 122, at least one handle 124 for steering using a steering axle assembly 126, at least one pedal 114, 116 attached to at least one crank arm 118, 120, and other mechanisms described herein. As described herein, in the example embodiment in FIGS. 4 and 6, the vehicle 100 has two pedals 114, 116 separately movable between an upper position and a lower position, with a restorative member, such as a spring 128, 129 for returning a given crank arm 118, 120 in the lower position to the upper position when the rider reduces or removes the downward force on the respective pedal 114, 116. In this embodiment, both crank arms 118, 120 are restored to the upper position regardless of the position of the opposing crank arm 118, 120. Thus, both crank arms 118, 120 are in the upper position in a rested, non-engaged state.

Figure 6:
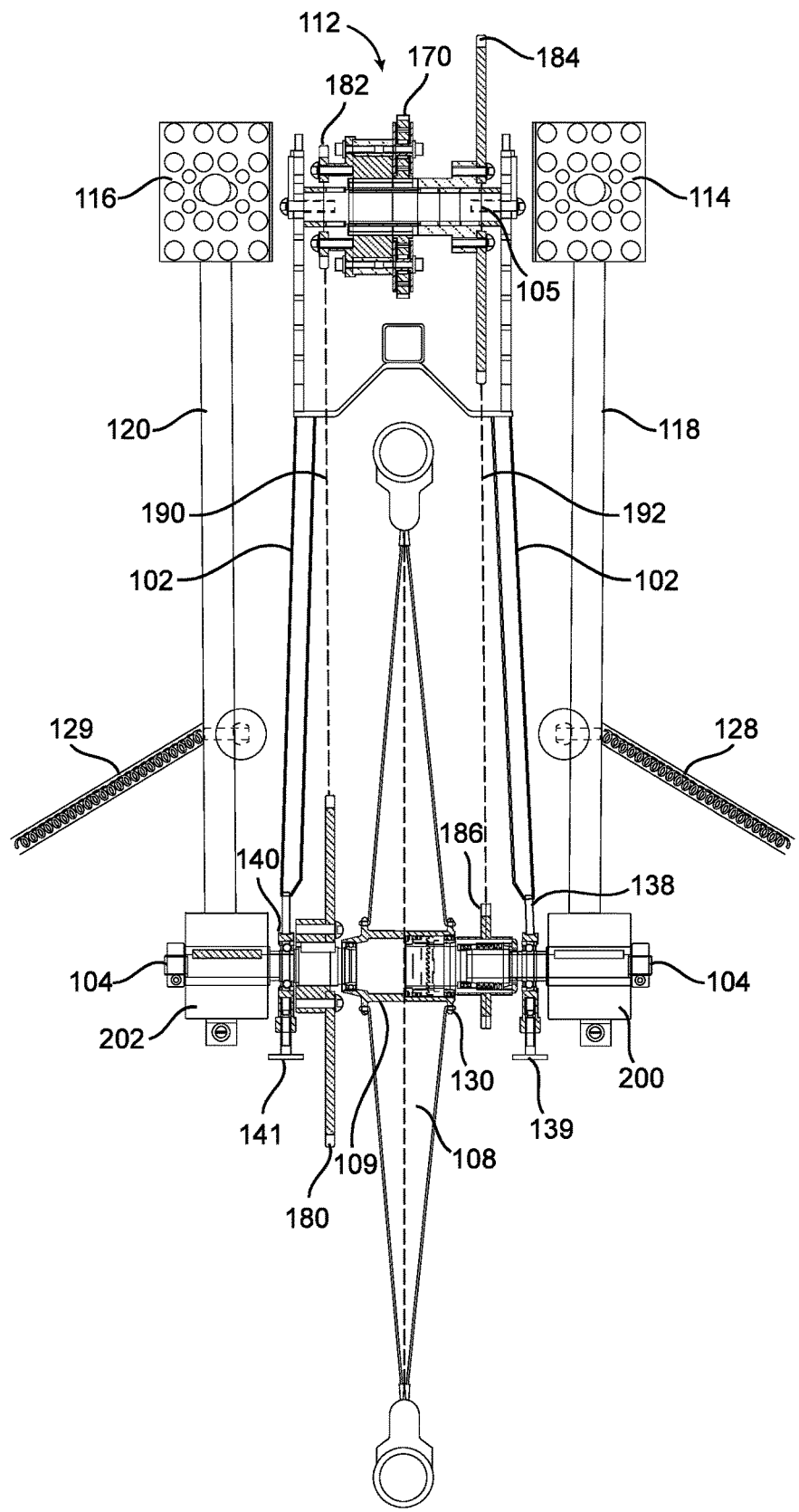
FIG. 6 is a partial top cross-sectional view of the frame of FIG. 4 showing a gear assembly having a balanced multi-sprocket and dual chain (BMSDC), in a first embodiment using springs.
Figure 11:
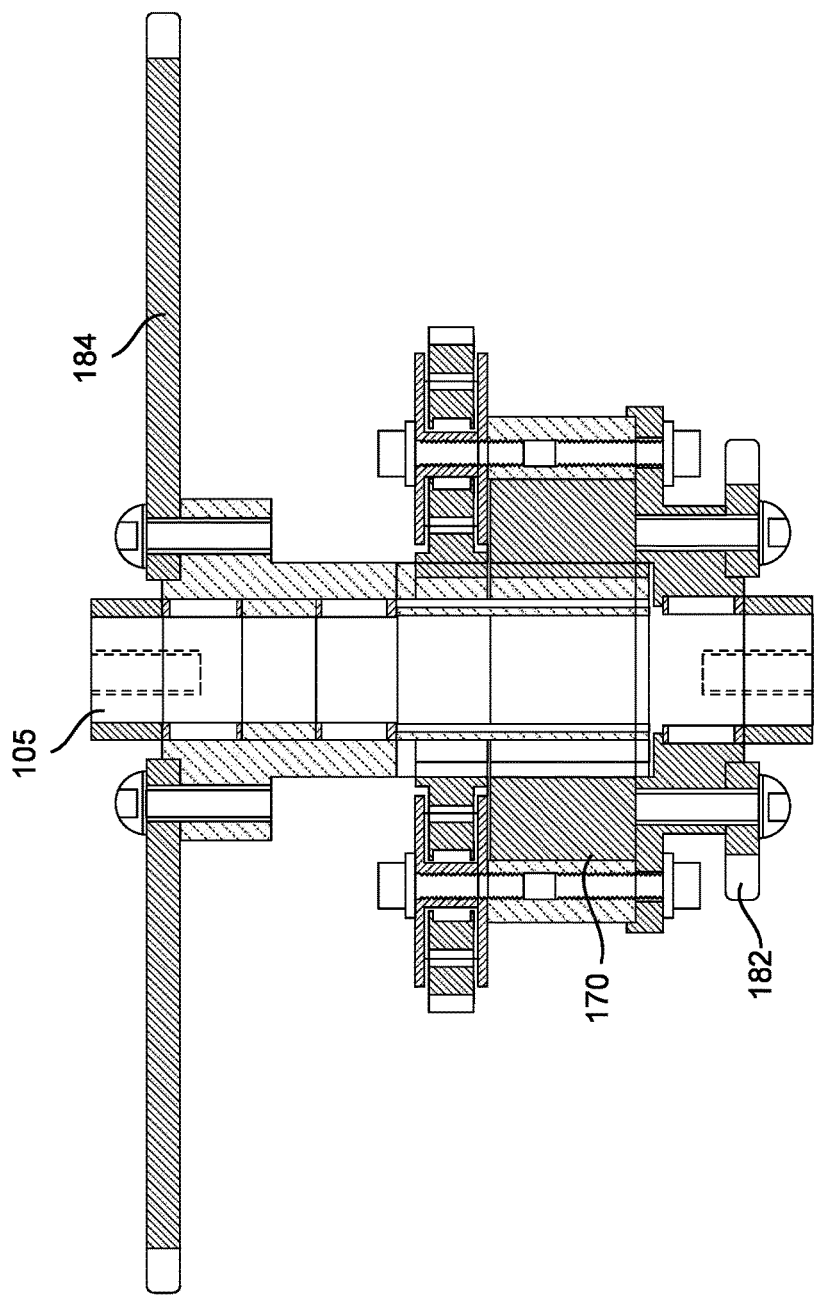
FIG. 11 is a cross-sectional view of an intermediate shaft and front portion of the gear assembly of the present invention having a multi ratio transmission (MRT)

Referring to FIGS. 4 and 6, the bicycle 100 includes a pair of sprockets 180-182/184-186 on each side of the frame 102 with each respective pair of sprockets 180-182/184-186 coupled together with a respective chain 190/192. The sprockets could be sized to meet desired RPM and speed requirements and therefore, an unlimited number of ratio combinations are available. As shown in FIG. 11, the front sprockets 182, 184 are fixed to each other and are rotatably coupled via bearings to an intermediate shaft 105, which is fixed to the frame 102. Without a multi ratio transmission (MRT), each sprocket 182, 184 rotates with each other at the same speed. However, an MRT could be utilized so that each sprocket 182, 184 rotates at different speeds. Referring to FIG. 12, the rear left sprocket (or first sprocket) 180 is fixedly coupled to the rear shaft 104. The rear right sprocket (or fourth sprocket) 186 is operably coupled to the wheel 108. Thus, better riding efficiency is accomplished with multiple chains. Moreover, none of the sprockets 180-186 are fixed to the crank arms 118, 120 and therefore, the inertia and RPMs are increased compared with prior art bicycles and there are no restrictions as to the location of the sprockets, crank arm or seat.

In operation, when the rider applies a downward force on the pedal 114, 116, the movement of the pedal 114, 116 is translated to a movement of the crank arm 118, 120 rotating about an axis of a one-way clutch 130 which circumscribes the rear shaft 104, which transfers the rotational movement directly to the rear wheel 108, as best shown in FIGS. 12 and 13. That is, a distal end of each crank arm 118, 120 includes a one-way alternating clutch 200, 202 which circumscribes the rear shaft 104 and bypasses the rear wheel assembly 108, 109. Thus, the forces from the crank arms 118, 120 are transmitted directly to the first sprocket 180 which transmits the forces to the subsequent sprockets 182, 184, 186, one-way clutch 130 and wheel assembly 108, 109. Therefore, if either chain 190, 192 is disconnected the system will not operate.

As shown in FIG. 6, each pedal 114, 116 is aligned with a corresponding crank arm 118, 120. With this configuration, the forces applied to the pedals 114, 116 are directly transferred to the crank arms 118, 120 thereby increasing power compared with a conventional bicycle in which the pedals are located on the sides of the crank arm offset to an outer portion of the crank arm. The crank arm configuration in the present embodiment also provides a safer riding experience because with the offset pedals of the prior art, the rider must shift his weight from side to side while pedaling while causing a downward twisting force between the pedal and crank arm.

Furthermore, power is increased due to the increased length of the crank arm 118, 120 (approximately 20 inches) compared with the conventional 7 inch crank arm. Moreover, with this configuration, the forces applied by the rider are evenly distributed within the center of the frame 102 as opposed to the constant shift in forces from right to left in a conventional bicycle. Also, in the present configuration, as shown in FIG. 5, the forces travel within the frame 102 in a clock-wise direction and are concentrated in the rear of the bicycle to promote a more balanced ride. On the other hand, in a conventional bicycle the forces on the left side must travel to the right side in order to reach the chain ring or sprocket.

Figure 10:
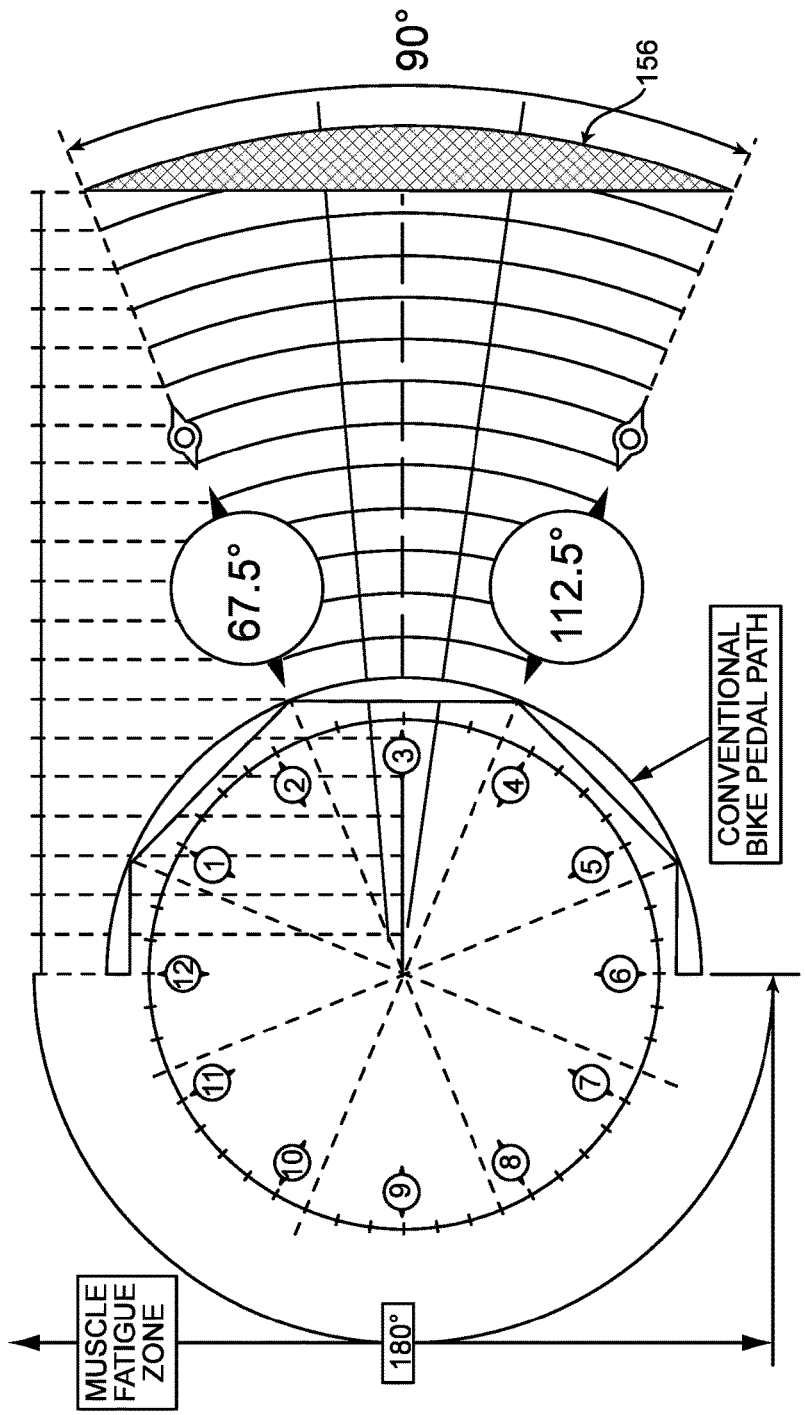
FIG. 10 is a diagram representing various angular positions of crank arms and pedals with optimal power-transfer zones.

As shown in FIGS. 4 and 10, the predetermined angular range of movement of the pedal 114, 116 of the present invention is less than 360 degrees, as opposed to pedals of bicycles in the prior art which revolve 360 degrees around an axis. In one example embodiment, the predetermined angular range of movement of the pedal is about 45 degrees. In another example embodiment, the predetermined angular range of movement of the pedal is between about 67.5 degrees clockwise from a vertical direction to about 112.5 degrees clockwise from the vertical direction.

Unlike a conventional bicycle, the rider is able to stand up fully in the bicycle of the present invention, thereby maximizing the use of his body weight (almost 100%) to push the bike forward. In the conventional bicycle, because the rider is unable to stand at all times and because most of the pedaling effort is wasted in dead zones (FIGS. 1 and 10), only about 53% of the rider's body weight is utilized in generating power and even so the power is used to pull the bicycle forward.

Referring to FIGS. 4 and 6, the gear assembly 112 includes the one-way clutch 130 coupling the at least one crank arm 118, 120 to the at least one wheel 108, 110 and/or the at least one wheel axle 104, 106 for applying the force in a one-way rotational direction to the at least one wheel 108, 110. Other mechanisms including additional tooth-and-chain gear configurations, such as a derailleur, may optionally be included in the gear assembly 112 to increase and control the power applied by the pedals 114, 116 and the crank arms 118, 120 to the rear axle 104, for example, using a gear shift or gear selector 132. Other forms of transmissions could be used as well, for example, a planetary gear 170 (FIGS. 6 and 7) to control speed and power.

Referring to FIG. 5, the frame 102 includes apertures, such as rear apertures 134, 136 when the rear wheel axle 104 and/or the rear wheel 108 for receiving an engagement member 138, 140 allowing the wheel shaft or axle 104 to freely rotate relative to the frame 102, and the rear wheel 108 is directly mounted on the axle 104, with the rear wheel 108 and axle 104 rotating together. Each of the engagement members 138, 140 are secured to the frame 102 with a lock nut 139, 141, as shown in FIG. 12. The engagement member 138, 140 is at least one roller bearing which rolls to permit the axle 104 to rotate freely without being fixedly mounted to the frame. Alternatively or in addition, the engagement member 138, 140 is composed of a lubricant and/or other substances or materials, such polytetrafluoroethylene (PTFE), commercially available under the trademark TEFLON. Accordingly, the motion of the at least one pedal 114, 116 and corresponding at least one crankshaft 118, 120, shown in FIG. 4, is directly applied to the rear shaft 104, the first sprocket 180 and subsequent sprockets 182, 184, 186 and then to the one-way clutch 130 and hub-cog-wheel assembly 108, 109, and a smoother ride is accomplished with the engagement members 138, 140 through shock absorption.

In FIGS. 4 and 6-8, at least one restorative member is included for generating a restorative force to return the at least one pedal 114, 116 and the at least one crank arm 118, 120 from a lower stroke position to an upper stroke position. As shown in FIGS. 4 and 6, in a first embodiment, the restorative member includes at least one spring 128, 129 on either lateral side of the frame 102 attached at one end to each corresponding crank arm 118, 120, with the other end attached to the frame 102, as shown in FIG. 4. Accordingly, if only one crank arm is employed, only one restorative spring is used and attached to the single crank arm, while alternative embodiments with two crank arms 118, 120 have two restorative springs 128, 129, as shown in FIG. 6, with one spring attached to each respective crank arm to restore each crank arm independently to the upper position. That is, both crank arms 118, 120 are restored to the upper position at the same time. Moreover, each crank arm 118, 120 is depressed to any level the rider desires. With the restorative springs 128, 129, the rider is capable of propelling the bicycle forward with both feet simultaneously, with one leg, no legs, or with one or more prosthetics. This is not possible with bicycles of the prior art. Also, the rider is now capable of pedaling while traveling through a turn because the outside pedal (pedal opposite surface) is still available during a turn and the rider is even capable of applying partial strokes to the pedals (including the inside pedal) without the pedals making contact with the ground surface due to the higher orientation of the pedals. On the contrary, on a conventional bicycle, the rider must ensure that the inside pedal (pedal adjacent to surface) is maintained in an upward position to avoid contact with the surface.

Figure 7:
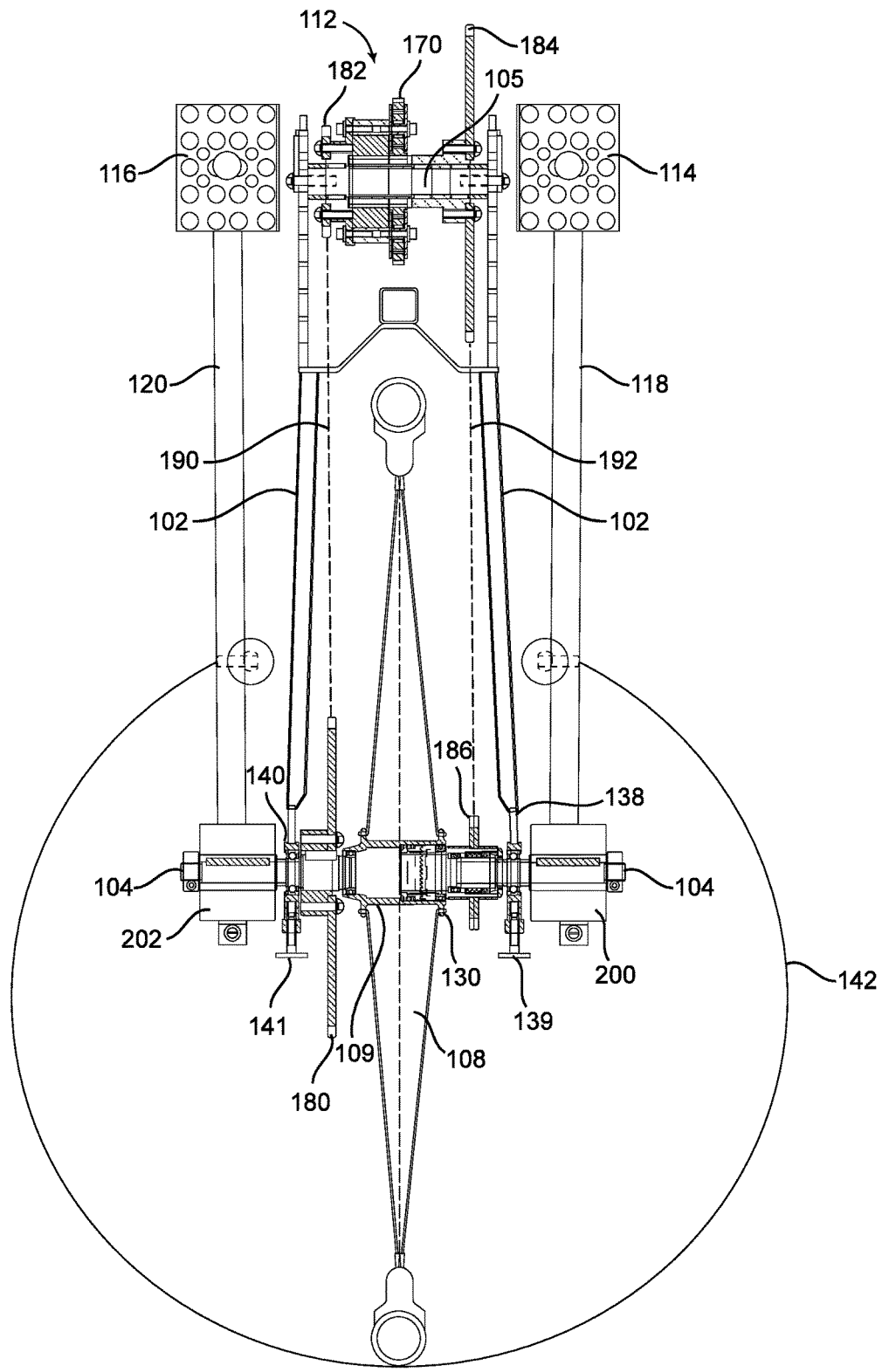
FIG. 7 is a partial top cross-sectional view of the frame of FIG. 4 showing a gear assembly, in a first embodiment using a pulley system.
Figure 8:
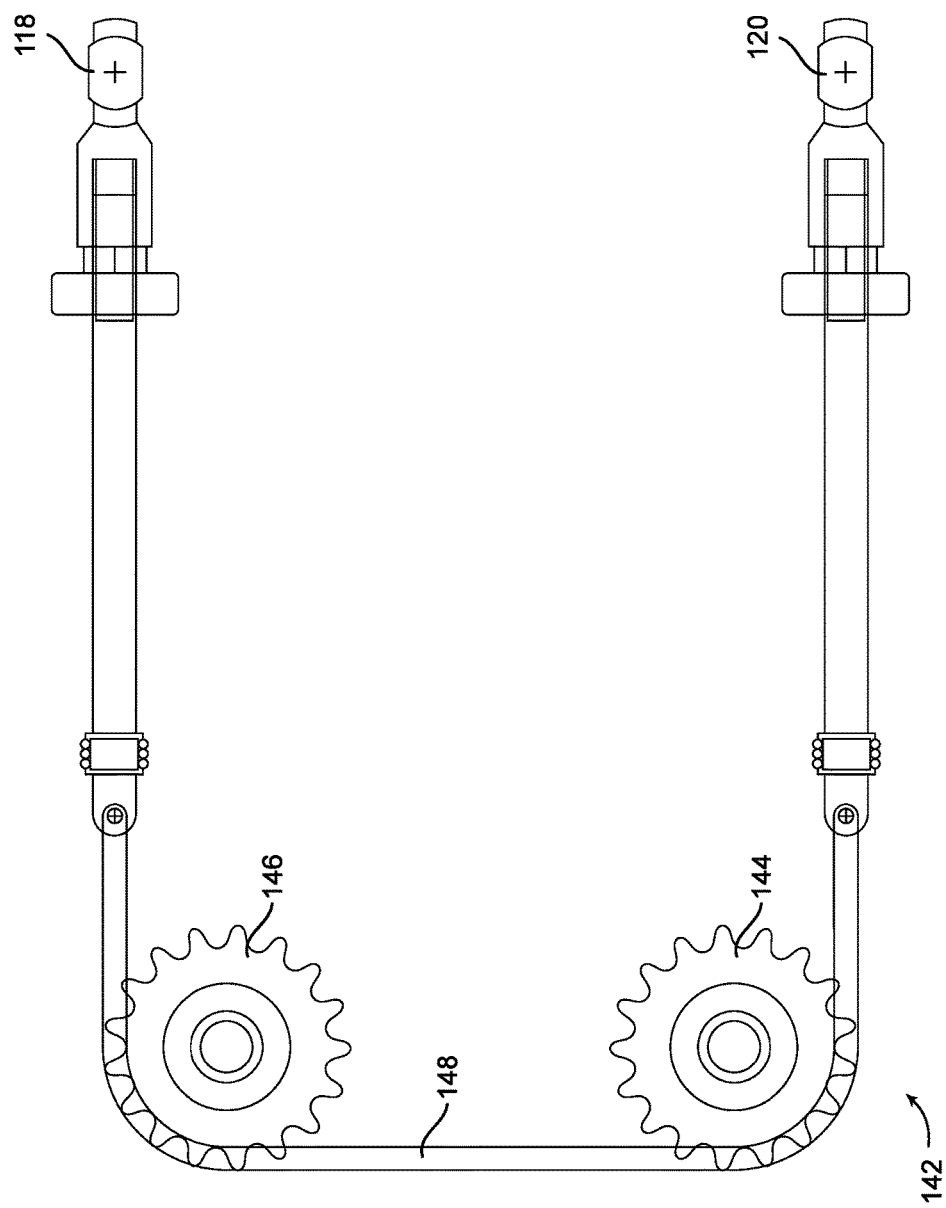
FIG. 8 is a rear cross-sectional view of the pulley system of FIG. 7.
Figure 8A:
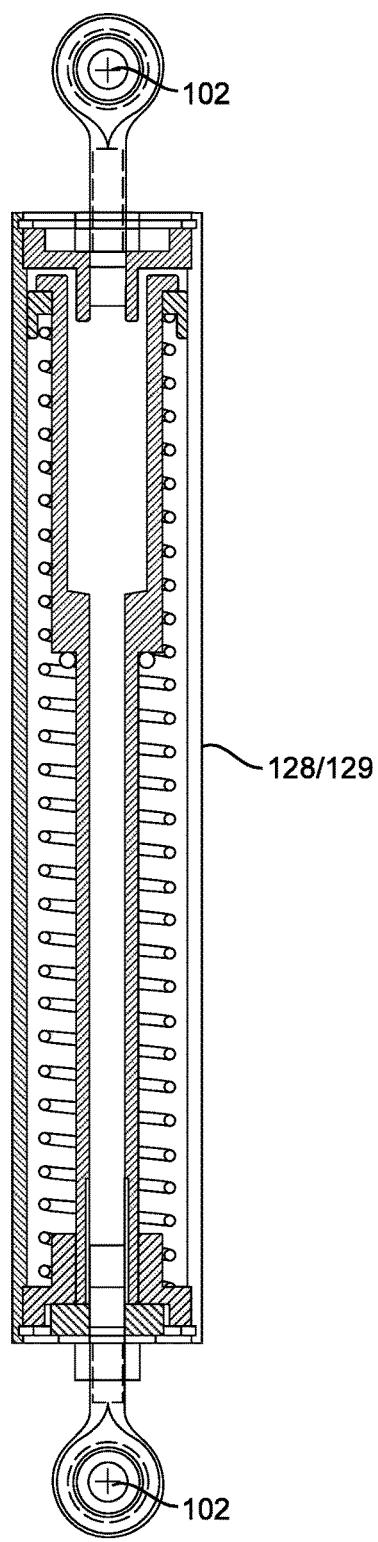
FIG. 8A is a side cross-sectional view of the spring system of FIG. 6.

In an alternative embodiment shown in FIGS. 7-8, the at least one crank arm includes a pair of crank arms 118, 120 and the restorative member is a pulley system 142 attached to the crank arms 118, 120 for moving the first crank arm 118 to the upper stroke position when the second crank arm 120 is moved to the lower stroke position, and for moving the first crank arm 118 to the lower stroke position when the second crank arm 120 is moved to the upper stroke position. Referring to FIG. 8, in an example embodiment, the pulley system 142 includes at least one pulley wheel 144, 146, such as gears or other forms of pulleys, over which a cable 148 extends to connect the crank arms 118, 120 in a complementary pulley arrangement, such that as the crank arm 118 moves downward by a pedal action by the rider, the pulley system 142 moves the crank arm 120 upward, and as the crank arm 120 moves downward by a pedal action by the rider, the pulley system 142 moves the crank arm 118 upward.

The restorative member of the present invention provides a means for increased RPM and speed. RPM and speed could be further increased by utilizing clipless pedals because the rider is capable of restoring the crank arms to the upward position quicker than by the restorative force of the restorative member. In the prior art, clipless pedals do not have this function as it they are only used to hold the rider's feet in place. In the present embodiment, order to place the pedals 114, 116 on the center of the crank arms 118, 120, the crank arms 118, 120 are curved so that the heel of the rider avoids contact with the crank arm 118, 120, as shown in FIG. 4.

Figure 9:
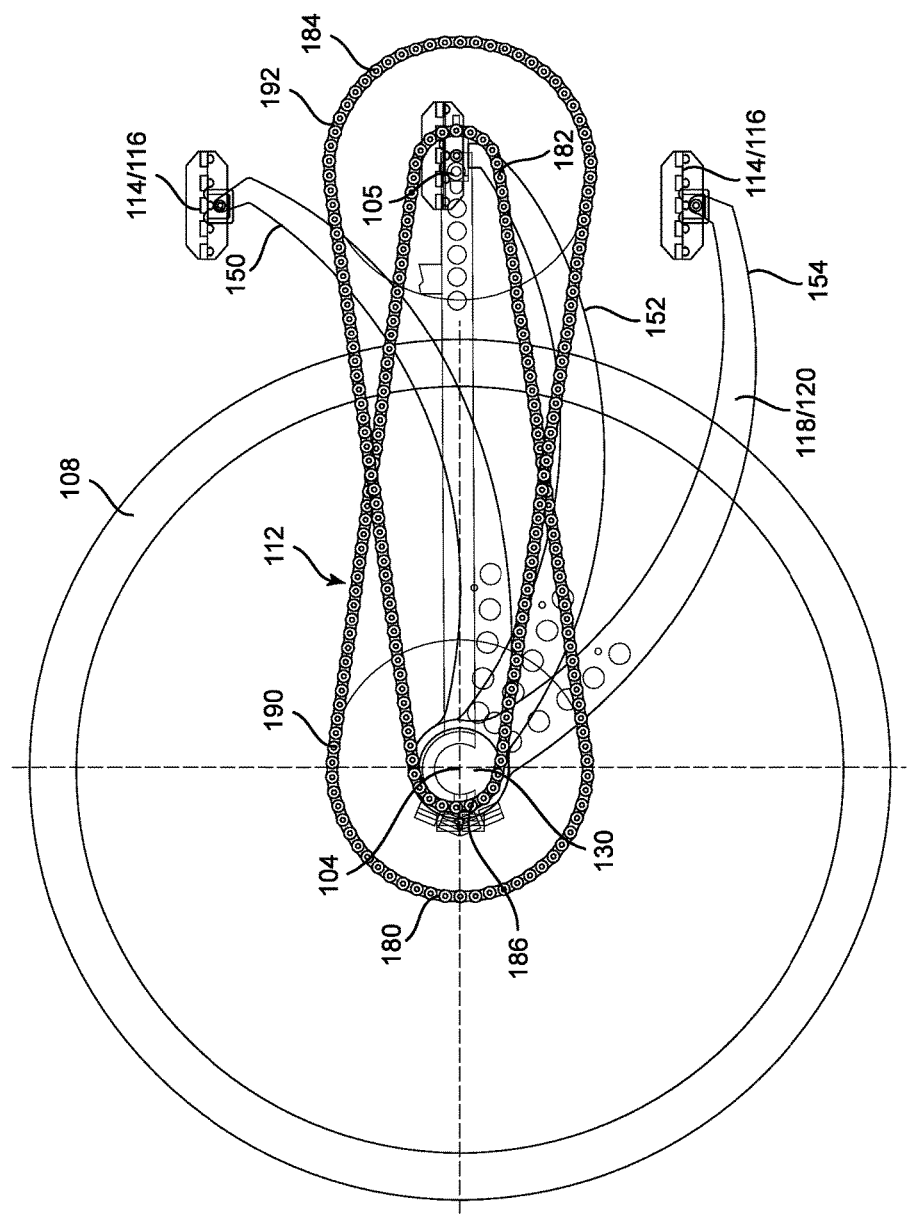
FIG. 9 is a partial side view of a gear assembly and a crank arm with a pedal in three different states.

As shown in FIG. 9, for either embodiments having only a single crank arm or a pair of crank arms 118, 120, each crank arm moves between an upper position 150 to at least one intermediate position 152, and finally to a lower position 154 in response to the downward force applied by the rider to the corresponding pedal of the at least one crank arm. In turn, the restorative member, described in connection with FIGS. 4 and 6-8, returns the crank arm 114 or a complementary crank arm 118 from the lower position 154 to the at least one intermediate position 152 and finally to an upper position 150 to receive a subsequent downward force applied by the rider.

FIG. 10 is a diagram representing various angular positions of crank arms and pedals with optimal power-transfer zones. As described herein, the predetermined angular range of movement of a pedal 114, 116 and its corresponding crank arm 118, 120 is about 45 degrees. In another example embodiment, the predetermined angular range of movement of the pedal is oriented in a predetermined zone 156 which is between about 67.5 degrees clockwise from a vertical direction to about 112.5 degrees clockwise from the vertical direction, which the present inventor has determined to provide optimal power transfer from the pedal 114, 116 to the rear wheel 108. Such limited ranges of angular motion of the pedal and crank arm avoid the muscle fatigue zones experience by riders of conventional bicycles with pedals revolving around and over 360 degrees about an axis. Low input zones include the areas between 12 o'clock and approximately 2 o'clock and between approximately 4 o'clock and 6 o'clock. A dead zone, or the area where pedaling has little to no effect on power, is located between 6 o'clock and 12 o'clock.

Referring to FIG. 11, the front sprockets 182, 184 are fixedly coupled to each other and rotatably mounted to the intermediate shaft or axle 105 via roller bearings. Each sprocket 182, 184 is coupled to a respective chain 190, 192 as shown in FIG. 4 as part of the gear assembly 112.

Figure 7A:
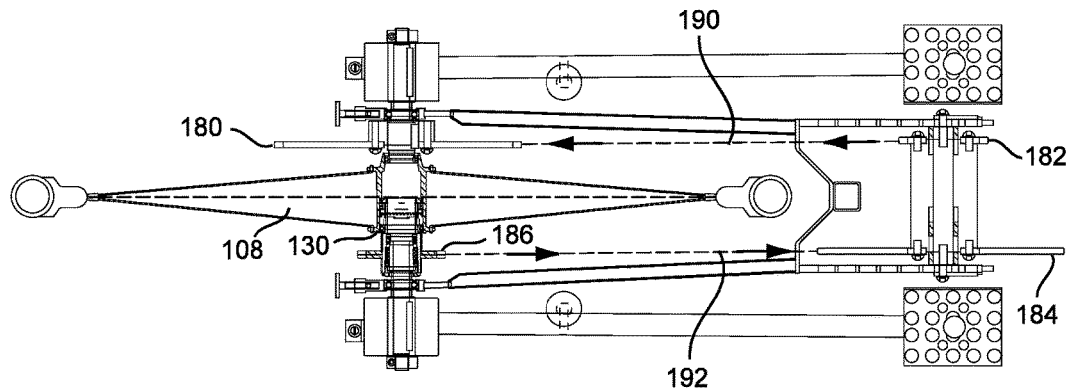
FIG. 7A is a partial top cross-sectional view of the frame of FIG. 4 showing a gear assembly of the first embodiment and the direction of the transferred forces.
Figure 7B:
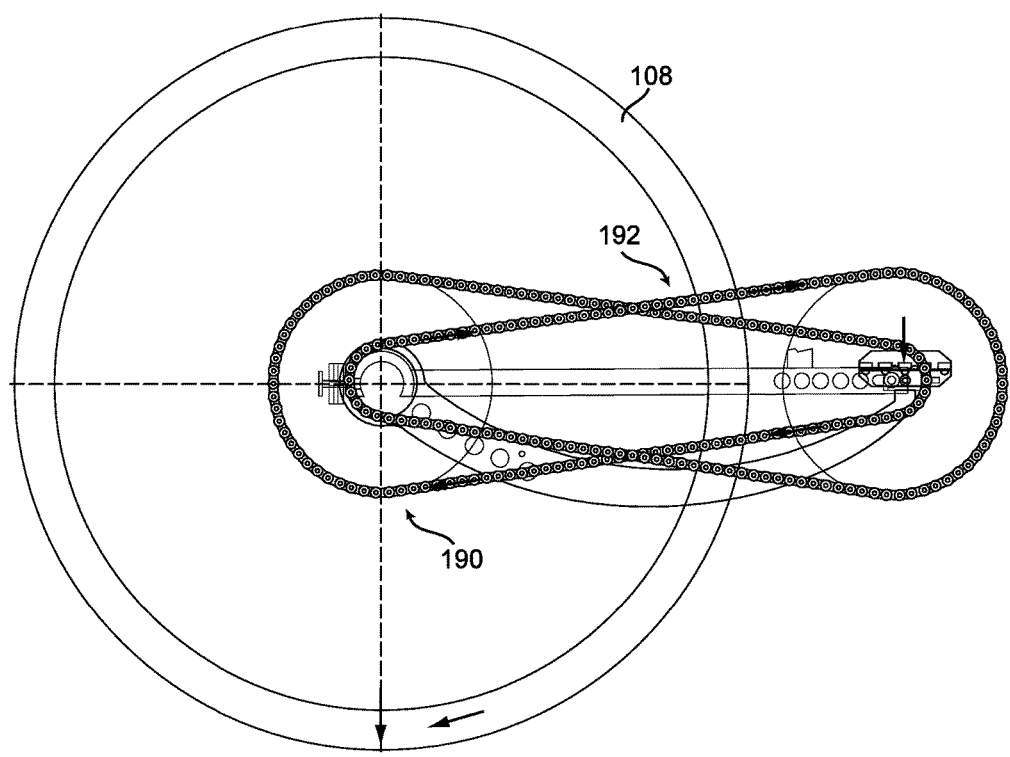
FIG. 7B is a partial side view of a gear assembly and a crank arm of a first embodiment showing the transfer of forces.

FIGS. 12 and 13 show the rear portion of the gear assembly 112. As shown in FIG. 12, the rear axle 104 engages the engagement members 138, 140, such as roller bearings, to freely rotate relative to the frame 102. As mentioned above, the first sprocket 180 is fixed to the rear wheel shaft 104. Referring to FIGS. 5, 7A and 7B, the rotational force is transferred clockwise from the rear left portion of the frame 102 at Position 1. That is, the rotational force of the first sprocket 180 is transferred to the second sprocket 182 at Position 2 via the first chain 190. The second sprocket 182 rotates the third sprocket 184 about the intermediate shaft 105 at Position 3. The third sprocket 184 in turn rotates the fourth sprocket 186 at Position 4 via the second chain 192. The fourth sprocket 186 is fixed to a first clutch member 160 of the one-way clutch 130. A second clutch member 162 is fixed to and integrally formed with the hub 109 (e.g., pressed fit) of the rear wheel 108. As mentioned above, the hub 109 circumscribes and is rotatably coupled to the rear wheel shaft 104 via roller bearings 111, 113.

Still referring to FIGS. 12-13, the first clutch member 160 and a second clutch member 162 include matching teeth 164, 166. The first clutch member 160 is biased by a biasing mechanism 168, such as a spring, to move laterally to engage and disengage the teeth of the second clutch member 162, to provide a ratchet-and-pawl mechanism. Accordingly, as shown in FIGS. 4, 12 and 13, as the first clutch member 160 is rotated in a first direction by the transferred motion from the fourth sprocket 186, the teeth 164, 166 of the clutch members 160, 162 engage, as shown in FIG. 13, and the second clutch member 162 is rotated in the first direction, which in turn rotates the rear wheel 108 in the first direction, such as a clockwise direction with reference to FIG. 4. In the present embodiment, the thickness or cross-sectional width of the fourth sprocket 186 is increased to provide additional strength. This is because the fourth sprocket 186 is the final sprocket which drives the bicycle and thus, all of the driving force is exerted here. However, a sprocket with standard thickness could be used as well. The clutch members 160, 162 disengage when the fourth sprocket 186 no longer rotates or when the rotational speed of the wheel 108 is greater than the rotational speed of the fourth sprocket 186.

With respect to the crank arms 118, 120, a one-way clutch 200, 202 is coupled between each crank arm 118, 120 and rear shaft 104 such that the rear shaft is rotated only when the crank arm 118, 120 is in a downward motion and disengaged when the crank arm 118, 120 is restored to an upper position. Thus, the forces generated from engagement of the crank arms 118, 120 drive the first sprocket 180 to initiate the transfer of rotational force to the other sprockets 182, 184 before engaging the fourth sprocket 186 (and the one-way clutch 130) to drive the CHW.

Other types of one-way clutch mechanisms known in the art can also be used, such as described in U.S. Pat. Nos. 5,964,332; 8,632,089; and U.S. Patent Publication No. 2010/0320720, which are incorporated herein by reference.

In further alternative embodiments, the gear assembly includes a plurality of stepper gears for increasing the power transfer of the speed from the at least one crank arm to the at least one wheel. In addition, the present invention is not limited to rotating just the rear wheel. The at least one wheel is selected from the group consisting of: a front wheel attached to the wheel shaft rotatable on a front member of the frame; and a rear wheel attached to the wheel shaft rotatable on a rear member of the frame. According, the crank arms and one-way clutch mechanism may be connected to only the front wheel instead of the rear wheel, or alternatively a first pair of a crank arm and a one-way clutch mechanism can be connected to the front wheel, while a second pair of a crank arm and a one-way clutch mechanism can be connected to the rear wheel. Also, the configuration of the gear assembly 112 could be reversed so that the forces travel counter-clockwise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A motion transfer apparatus comprising:
a gear assembly coupled to a rider-powered vehicle having at least one wheel operably coupled to a wheel shaft rotatable on a frame;
at least one pedal engaging the gear assembly and movable within a predetermined angular range to apply a force;
at least one crank arm with a predetermined length coupled to the at least one pedal and to the gear assembly for applying the force directly from the pedal to the gear assembly to rotate the at least one wheel, each crank arm being curved;
the predetermined angular range of movement of the pedal being between about 67.5 degrees clockwise from a vertical direction to about 112.5 degrees clockwise from the vertical direction;
the gear assembly including a first sprocket fixed to the wheel shaft, a second sprocket fixed to an intermediate shaft mounted to the frame at a fixed distance from the first sprocket, a third sprocket fixed to the intermediate shaft, a fourth sprocket mounted to a one way clutch, the one way clutch being mounted to the wheel shaft; a first chain coupled to the first and second sprockets, and a second chain coupled to the third and fourth sprocket;
a restorative member generating a restorative force to return the pedal and the at least one crank arm from a lower stroke position to an upper stroke position; and
an engagement member for allowing the wheel shaft to freely rotate relative to the frame.

2. The motion transfer apparatus of claim 1, wherein the rider-powered vehicle is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft.

3. The motion transfer apparatus of claim 1, wherein the restorative member is a spring.

4. The motion transfer apparatus of claim 1, wherein the at least one crank arm includes first and second crank arms; and
wherein the restorative member is a pulley attached to the first and second crank arms for moving the first crank arm to the upper stroke position when the second crank arm is moved to the lower stroke position, and for moving the first crankarm to the lower stroke position when the second crank arm is moved to the upper stroke position.

5. The motion transfer apparatus of claim 1, wherein the engagement member is at least one roller bearing.

6. The motion transfer apparatus of claim 1, wherein the engagement member comprises a lubricant.

7. The motion transfer apparatus of claim 1, wherein the gear assembly includes a plurality of stepper gears for increasing the power transfer of the force from the at least one crank arm to the at least one wheel.

8. The motion transfer apparatus of claim 1, wherein the at least one wheel is selected from the group consisting of:
a front wheel attached to the wheel shaft rotatable on a front member of the frame;
and a rear wheel attached to the wheel shaft rotatable on a rear member of the frame.

9. A rider-powered vehicle comprising:
a frame;
a wheel shaft rotatable on the frame;
at least one wheel attached to and rotating about the wheel shaft;
a gear assembly coupled to the at least one wheel;
at least one pedal engaging the gear assembly and movable within a predetermined angular range to apply a force;
at least one crank arm with a predetermined length coupled to the at least one pedal and to the gear assembly for applying the force directly from the pedal to the gear assembly to rotate the at least one wheel, each crank arm being curved;
the predetermined angular range of movement of the pedal being between about 67.5 degrees clockwise from a vertical direction to about 112.5 degrees clockwise from the vertical direction;
the gear assembly including a first sprocket fixed to the wheel shaft, a second sprocket fixed to an intermediate shaft mounted to the frame at fixed distance from the first sprocket, a third sprocket fixed to the intermediate shaft, a fourth sprocket mounted to a one way clutch, the one way clutch being mounted to the wheel shaft;

a first chain coupled to the first and second sprockets, and a second chain coupled to the third and fourth sprocket;

a restorative member generating a restorative force to return the pedal and the at least one crank arm from a lower stroke position to an upper stroke position; and an engagement member for allowing the wheel shaft to freely rotate relative to the frame.

10. The rider-powered vehicle of claim 9, wherein the rider-powered vehicle is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft.

11. The rider-powered vehicle of claim 9, wherein the restorative member is a spring.

12. The rider-powered vehicle of claim 10, wherein the at least one crank arm includes first and second crank arms; and wherein the restorative member is a pulley attached to the first and second crank arms for moving the first crank arm to the upper stroke position when the second crank arm is moved to the lower stroke position, and for moving the first crank arm to the lower stroke position when the second crank arm is moved to the upper stroke position.

13. The rider-powered vehicle of claim 9, wherein the engagement member is at least one roller bearing.

14. The rider-powered vehicle of claim 9, wherein the engagement member comprises a lubricant.

15. The rider-powered vehicle of claim 9, wherein the gear assembly includes a plurality of stepper gears for increasing the power transfer of the force from the at least one crank arm to the at least one wheel.

16. The rider-powered vehicle of claim 9, wherein the at least one wheel is selected from the group consisting of:

a front wheel attached to the wheel shaft rotatable on a front member of the frame;

and a rear wheel attached to the wheel shaft rotatable on a rear member of the frame.

17. A cycle comprising:

a frame;

front and rear wheel shafts each rotatable on the frame;

at least one front wheel attached to and rotating with the front wheel shaft rotatable on the frame;

at least one rear wheel attached to and rotating about the rear wheel shaft;

a gear assembly including a first sprocket fixed to the rear wheel shaft, a second sprocket fixed to an intermediate shaft mounted to the frame at a fixed distance from the first sprocket, a third sprocket fixed to the intermediate shaft, a fourth sprocket mounted to a one way clutch, the one way clutch being mounted to the rear wheel shaft;

a first chain coupled to the first and second sprockets, and a second chain, coupled to the third and fourth sprocket;

at least one pedal engaging the gear assembly and movable within a predetermined angular range to apply the force, the predetermined angular range of movement of the pedal being between about 67.5 degrees clockwise from a vertical direction to about 112.5 degrees clockwise from the vertical direction;

at least one crank arm with a predetermined length coupled to the at least one pedal and to the gear assembly for applying the force directly from the pedal to the gear assembly to rotate the at least one rear wheel by the one-way clutch in the one-way rotational direction, each crank arm being curved;

a restorative member generating a restorative force to return the pedal and the at least one crank arm from a lower stroke position to an upper stroke position; and an engagement member for allowing the corresponding wheel shaft to freely rotate relative to the frame.

18. The cycle of claim 17, wherein the cycle is selected from the group consisting of a bicycle, a tricycle, a cargo bike, a paddleboat, a wheelchair, a rider-powered passenger-carrying vehicle, a velocipede, a handcar, a railroad handcar, and a rider-powered aircraft.

19. The cycle of claim 17, wherein the restorative member is a spring.

20. The cycle of claim 17, wherein the at least one crank arm includes first and second crank arms, and the restorative member is a pulley attached to the first and second crank arms for moving the first crank arm to the upper stroke position when the second crank arm is moved to the lower stroke position, and for moving the first crank arm to the lower stroke position when the second crank arm is moved to the upper stroke position.

21. The cycle of claim 17, wherein the engagement member is at least one roller bearing.

22. The cycle of claim 17, wherein the engagement member comprises a lubricant.

23. The cycle of claim 17, wherein the gear assembly includes a plurality of stepper gears for increasing the power transfer of the force from the at least one crankarm to the at least one rear wheel.

24. The cycle of claim 17, wherein the at least one pedal is integrally formed and fixed to the at least one crank arm in an aligned configuration.

25. The cycle of claim 17, wherein the gear assembly includes a multi ratio transmission.

* * * * *